US009106491B2

(12) United States Patent
Kitsunezuka

(10) Patent No.: US 9,106,491 B2
(45) Date of Patent: Aug. 11, 2015

(54) RECEIVER CIRCUIT AND FILTERING METHOD USED THEREIN

(75) Inventor: Masaki Kitsunezuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 14/008,614

(22) PCT Filed: Mar. 28, 2012

(86) PCT No.: PCT/JP2012/058106
§ 371 (c)(1),
(2), (4) Date: Sep. 30, 2013

(87) PCT Pub. No.: WO2012/133516
PCT Pub. Date: Oct. 4, 2012

(65) Prior Publication Data
US 2014/0029707 A1   Jan. 30, 2014

(30) Foreign Application Priority Data

Mar. 28, 2011   (JP) ................. 2011-069489

(51) Int. Cl.
*H04B 1/28*   (2006.01)
*H04B 1/16*   (2006.01)
*H04L 27/148*   (2006.01)

(52) U.S. Cl.
CPC ............... *H04L 27/148* (2013.01); *H04B 1/28* (2013.01)

(58) Field of Classification Search
CPC ........ H04L 27/148; H04B 1/28; H04B 17/02; H04B 1/16
USPC ............. 455/130, 132, 133, 137, 143, 168.1, 455/189.1, 191.1, 209, 213, 225, 287, 306, 455/307, 334; 375/350
See application file for complete search history.

(56) References Cited

U.S. PATENT DOCUMENTS 6,072,996 A * 6/2000 Smith ................... 455/189.1
6,115,590 A * 9/2000 Tanaka .................. 455/266

(Continued)

FOREIGN PATENT DOCUMENTS

JP    7-273682 A   10/1995
JP   11-112382 A    4/1999

(Continued)

OTHER PUBLICATIONS

V. Giannini et al., "A 2mm2 0.1-to-5 GHz SDR Receiver in 45 nm Digital CMOS", IEEE International Solid-State Circuits Conference, ISSCC Dig. Tech. Papers, ISSCC 2009 / Session 24/ Wireless Connectivity / 24.1, pp. 408-409, Feb. 2009.

(Continued)

*Primary Examiner* — Pablo Tran
(74) *Attorney, Agent, or Firm* — Sughrue Mion, PLLC

(57) ABSTRACT

A receiver circuit includes a first mixer that performs frequency conversion on a first signal containing a first frequency entered from outside to output the resulting frequency-converted first signal, and a first selector that selects one out of an output signal of the first mixer and a second signal containing a second frequency entered from outside. A filter removes a pre-set frequency band of the signal selected by the first selector, and a second selector selects between outputting the signal removed of the frequency band to outside and outputting the signal to a subsequent side circuit. A second mixer performs frequency conversion of the signal output from the second selector to output the resulting frequency-converted signal. The second mixer is the subsequent side circuit. The second frequency has a carrier frequency of a radio signal.

9 Claims, 11 Drawing Sheets

(56) References Cited

U.S. PATENT DOCUMENTS

| | | | | |
|---|---|---|---|---|
| 6,343,221 | B1* | 1/2002 | Toda et al. | 455/553.1 |
| 7,035,595 | B1* | 4/2006 | Kim et al. | 455/73 |
| 7,636,554 | B2* | 12/2009 | Sugar et al. | 455/73 |
| 7,693,503 | B2* | 4/2010 | Su et al. | 455/323 |
| 8,929,848 | B2* | 1/2015 | Chien et al. | 455/307 |
| 2001/0049267 | A1* | 12/2001 | Takalo et al. | 455/84 |
| 2012/0052822 | A1* | 3/2012 | Monroe | 455/90.2 |

FOREIGN PATENT DOCUMENTS

| | | | |
|---|---|---|---|
| JP | 2001345727 A | 12/2001 | |
| JP | 2008116230 A | 5/2008 | |

OTHER PUBLICATIONS

S. Lerstaveesin et al., "A 48-860 MHz CMOS Low-IF Direct-Conversion DTV Tuner", IEEE Journal of Solid-State Circuits, vol. 43, No. 9, pp. 2013-2024, Sep. 2008.

International Search Report for PCT Application No. PCT/JP2012/058106 mailed on May 15, 2012.

Japanese Office Action for JP Application No. 2013-507665 mailed on Jun. 16, 2015 with English Translation.

* cited by examiner

RECEIVER CIRCUIT AND FILTERING METHOD USED THEREIN

CROSS-REFERENCE TO RELATED APPLICATION

This application is a National Stage Entry of PCT/JP2012/058106 filed on Mar. 28, 2012, which claims priority from JP Patent Application 2011-069489 filed in Japan on Mar. 28, 2011, the contents of all of which are incorporated herein by reference, in their entirety.

This invention relates to a receiver circuit and a filtering method. More particularly, it relates to a receiver circuit configured to deal with a plurality of wireless standards, and a filtering method used in the receiver circuit.

TECHNICAL FIELD

Background

These days, integrated circuits (ICs) for wireless use, such as those for terrestrial digital television broadcast or wireless LAN (Local Area Network), are used loaded on mobile phones. The carrier frequency of terrestrial digital television broadcast is 862 MHz or less and its signal bandwidth is 8 MHz, while the carrier frequency of wireless LAN is 5 GHz or less and its signal bandwidth is 40 MHz or less, such that, in most of principal wireless standards, the carrier frequency is 5 GHz or less and the signal bandwidth is 100 MHz or less. On the other hand, researches in UWB (Ultra Wideband), exploiting the carrier frequency of 10 GHz at the maximum and a signal bandwidth of 500 MHz or higher, WirelessHD (Wireless High Definition), exploiting the carrier frequency of 60 GHz and a signal bandwidth of several GHz or higher, or WiGig (Wireless Gigabit), are now underway to achieve high-speed radio communication. It is desired that such an IC for wireless use, capable of dealing with the multiple standards by a single chip, will be on the market in time to come.

Currently, attempts are being made to cope with a plurality of wireless standards with the carrier frequency of 5 GHz or less and with a signal bandwidth of 100 MHz or less. See e.g., Non-Patent Literatures 1, 2. On the other hand, communication standards exploiting ultra-wide bands, such as UWB or millimeter waves, are becoming difficult to cope with by general-purpose circuits because of the higher frequencies handled under those standards. Thus, to implement a receiver IC capable of not only receiving the terrestrial digital television broadcast or the wireless LAN but also dealing with the wireless standards exploiting the ultra-wide bands, including UWB, such a configuration comprised of a plurality of signal processing systems arranged in parallel, as shown in FIG. 11, is felt to be a realistic solution.

A receiver of FIG. 11 is made up by a first receiver system 110a, handling specified wireless standards of ultra-wide bands, and a second receiver system 110b, handling principal wireless standards, such as wireless LAN. The first receiver system 110a is a receiver system devoted e.g., to UWB, and the band used by UWB is pre-selected by a band selective filter outside the IC. The second receiver system 110b is a general-purpose receiver system capable of dealing with wireless standards of the carrier frequency of 5 GHz or less and a signal bandwidth of 100 MHz or less. The band of 5 GHz or less is pre-selected by a band selective filter outside the IC.

In the first receiver system 110a, a radio frequency (RF) signal is entered via an antenna 101a and a band selective filter 102a to a low noise amplifier (LNA) 103a within an IC. In next following mixers 104a, 104b, frequency conversion to the baseband (BB) and quadrature demodulation are carried out at the same time. Signal processing such as further filtering or amplitude adjustment is carried out in channel selective filters 105a, 105b or variable gain amplifiers (VGAs) 106a, 106b. The resulting signals are converted by analog-to-digital converters (ADCs) 107a, 107b into digital signals, which are then subject to sundry digital processing operations by a digital baseband unit 109.

The second receiver system 110b differs from the first receiver system 110a in that an RF filter 108 is arranged in a subsequent stage to a LNA 103b. This difference results from the fact, in the first receiver system 110a, interfering signals (interferers) of a frequency outside the band used in e.g., the UWB, are pre-removed, whereas, in the second receiver system 110b, signals of sundry carrier frequencies of 5 GHz or less are entered. In short, to avoid cross-talk in a subsequent stage circuit(s), it is necessary to use the RF filter 108 just the signal of the desired carrier frequency is allowed to pass through.

By the above described arrangement of the receiver, in which a plurality of signal processing systems are arranged side-by-side, a plurality of wireless standards may be accommodated with much ease.

In this connection, Patent Literature 1 discloses an intermediate frequency generation system for a wireless part in a TDMA or TDD communication system. In the intermediate frequency generation system, a first mixer which mixes a first local oscillator frequency signal is provided on one side of a bandpass filter used in common for transmission and reception. A second mixer which mixes a second local oscillator frequency signal is provided on the other side of the bandpass filter. A third mixer which mixes the second local oscillator frequency signal is provided on the other side of the bandpass filter. In addition, a fourth mixer which mixes the first local oscillator frequency signal is provided on the one side of the bandpass filter. The third mixer mixes the second local oscillator frequency signal with a frequency signal which is the same as a second intermediate frequency signal. A quadrature modulator modulating a transmission signal with a first intermediate frequency signal is provided between the common bandpass filter and the fourth mixer.

[Patent Literature 1]
JP Patent Kokai JP-A-7-273682
[Non-Patent Literature 1]
V. Giannini et al., "A 2 mm2 0.1-to-5 GHz SDR Receiver in 45 nm Digital CMOS", ISSCC Dig. Tech. Papers, pp. 408-409, February 2009
[Non-Patent Literature 2]
S. Lerstaveesin et al., "A 48-860 MHz CMOS Low-IF Direct-Conversion DTV Tuner", IEEE J. Solid-State Circuits, vol. 43, no. 9, pp. 2013-2024 September. 2008

SUMMARY

The following analysis is provided in the present invention.

The conventional receiver has a drawback that the circuit area is increased, thus raising the costs. Viz., in a receiver circuit integrated in an IC, it is necessary to provide three sorts of filters, viz., channel selective filters 105a, 105b of the first receiver system, and an RF filter 108 as well as channel selective filters 105c, 105d of the second receiver system. In general, a filter circuit uses a larger number of passive elements, such as capacitances, and hence has an increased area, which is not negligible as compared to the entire receiver area. In light of the above, it is an object of the present invention to provide a receiver circuit of a small area and a filtering method used in the receiver circuit.

In one aspect of the present invention there is provided a receiver circuit. The receiver circuit comprises a first mixer that performs frequency conversion on a first signal of a first frequency, entered from outside, to output a resulting frequency-converted first signal, and a first selector that selects one out of the output signal of the first mixer and a second signal of a second frequency entered from outside. The receiver circuit also comprises a filter that removes a pre-set frequency band of the signal selected by the first selector, and a second selector that selects between outputting the signal removed of the frequency band to outside and outputting the signal to a subsequent side circuit. The receiver further comprises a second mixer that performs frequency conversion on the signal selected by the second selector to output the resulting frequency-converted signal, and that is the above mentioned subsequent side circuit. The second frequency is equal to a carrier frequency of a radio signal.

In another aspect of the present invention there is provided a receiver circuit. The receiver circuit comprises a first mixer that performs frequency conversion on a first component of a first signal of a first frequency, entered from outside, to output a resulting frequency-converted component of the first signal. The receiver circuit also comprises a second mixer that performs frequency conversion on a second component of the first signal to output a resulting frequency-converted second component of the first signal. The receiver circuit also comprises a first selector that selects the frequency-converted first component of the first signal or a second signal of a second frequency entered from outside, and a second selector that selects the frequency converted second component of the first signal or the second signal. The receiver circuit also comprises a first filter that removes a first frequency band of the signal selected by the first selector, and a second filter that removes a second frequency band of the signal selected by the second selector. The receiver circuit also comprises a third selector that selects between outputting to outside and outputting to a subsequent side circuit(s) of the signal removed of the first frequency band, and a fourth selector that selects between outputting to outside and outputting to the subsequent side circuit(s) of the signal removed of the second frequency band. The receiver circuit further comprises third and fourth mixers that perform frequency conversion on the signal output from the third selector or the signal output from the fourth selector and that are the above mentioned subsequent side circuit(s).

In a further aspect of the present invention there is provided a signal filtering method. The signal filtering method in a receiver circuit comprises selecting a first signal or a second signal. The first signal is a signal obtained on frequency conversion of a signal that is entered from outside and that has a first frequency, and the second signal is a signal entered from outside and has a carrier frequency of a radio signal. The filtering method also comprises removing a pre-set frequency band of the signal selected, and selecting between outputting the signal freed of the frequency band to outside, and converting the frequency of the signal to output the frequency-converted signal to outside.

According to the present invention, the chip area may be decreased.

PREFERRED MODES

Figure 1:
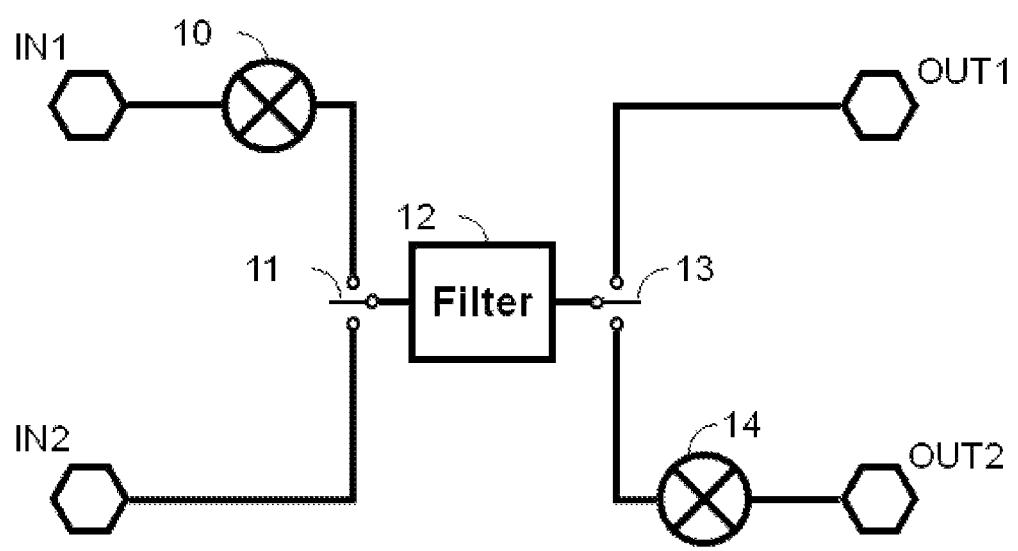
FIG. 1 is a circuit diagram showing a configuration of a receiver circuit according to exemplary embodiment 1 of the present invention.

Several modes for carrying out the present invention will now be described with reference to the drawings. It should be noted that symbols referencing the drawings are merely for assisting in the understanding and are not intended to restrict the invention to the particular modes illustrated.

In an exemplary embodiment of the present invention, a receiver circuit includes a first mixer (10 of FIG. 1) that performs frequency conversion on a first signal of a first frequency, entered from outside, and that outputs the resulting frequency-converted first signal. The receiver circuit also includes a first selector (11 of FIG. 1) that selects one out of a signal output from the first mixer and a second signal of a second frequency entered from outside, and a filter (12 of FIG. 1) that removes a pre-set frequency band of the signal selected by the first selector. The receiver circuit also includes a second selector (13 of FIG. 1) that selects between outputting the signal removed(freed) of the frequency band to outside and outputting the signal to a subsequent side circuit. The receiver circuit further includes a second mixer (14 of FIG. 1) that performs frequency conversion on the signal output from the second selector to output the resulting frequency-converted signal. The second mixer represents the subsequent side circuit. The second frequency is equal to the carrier frequency of a radio signal.

In the receiver circuit, the filter may respectively operate as an input side and as an output side for the first and second selectors, respectively.

In the receiver circuit, the frequency band may be determined depending on whether the signal selected by the first selector is the frequency-converted first signal or the second signal.

In another exemplary embodiment of the present invention, a receiver circuit includes a first mixer (60 of FIG. 6) that performs frequency conversion on a first component of a first signal of a first frequency, entered from outside, to output the resulting frequency-converted first component of the first signal. The receiver circuit also includes a second mixer (61 of FIG. 6) that performs frequency conversion on a second component of the first signal to output the resulting frequency-converted second component of the first signal. The receiver circuit also includes a first selector (62 of FIG. 6) that selects the frequency-converted first component of the first signal entered from outside or a second signal of a second frequency entered from outside, and a second selector (63 of FIG. 6) that selects the frequency converted second component of the first signal or the second signal. The receiver circuit also includes a first filter (64 of FIG. 6) that removes a first frequency band of the signal selected by the first selector and a second filter (65 of FIG. 6) that removes a second frequency band of the signal selected by the second selector. The receiver circuit also includes a third selector (66 of FIG. 6) that selects between outputting to outside and outputting to a subsequent side circuit(s) of the signal freed of the first frequency band and a fourth selector (67 of FIG. 6) that selects between outputting to outside and outputting to the subsequent side circuit(s) of the signal freed of the second frequency band. The receiver circuit further includes a third mixer (68 of FIG. 6) and a fourth mixer (69 of FIG. 6) that perform frequency conversion on the signal output from the third selector or the signal output from the fourth selector. The third and fourth mixers represent the subsequent side circuit(s).

In the receiver circuit, the first frequency band may be determined depending on whether the signal selected by the first selector is the signal output from the first mixer or the second signal, while the second frequency band may be determined depending on whether the signal selected by the second selector is the signal output from the second mixer or the second signal.

Figure 7:
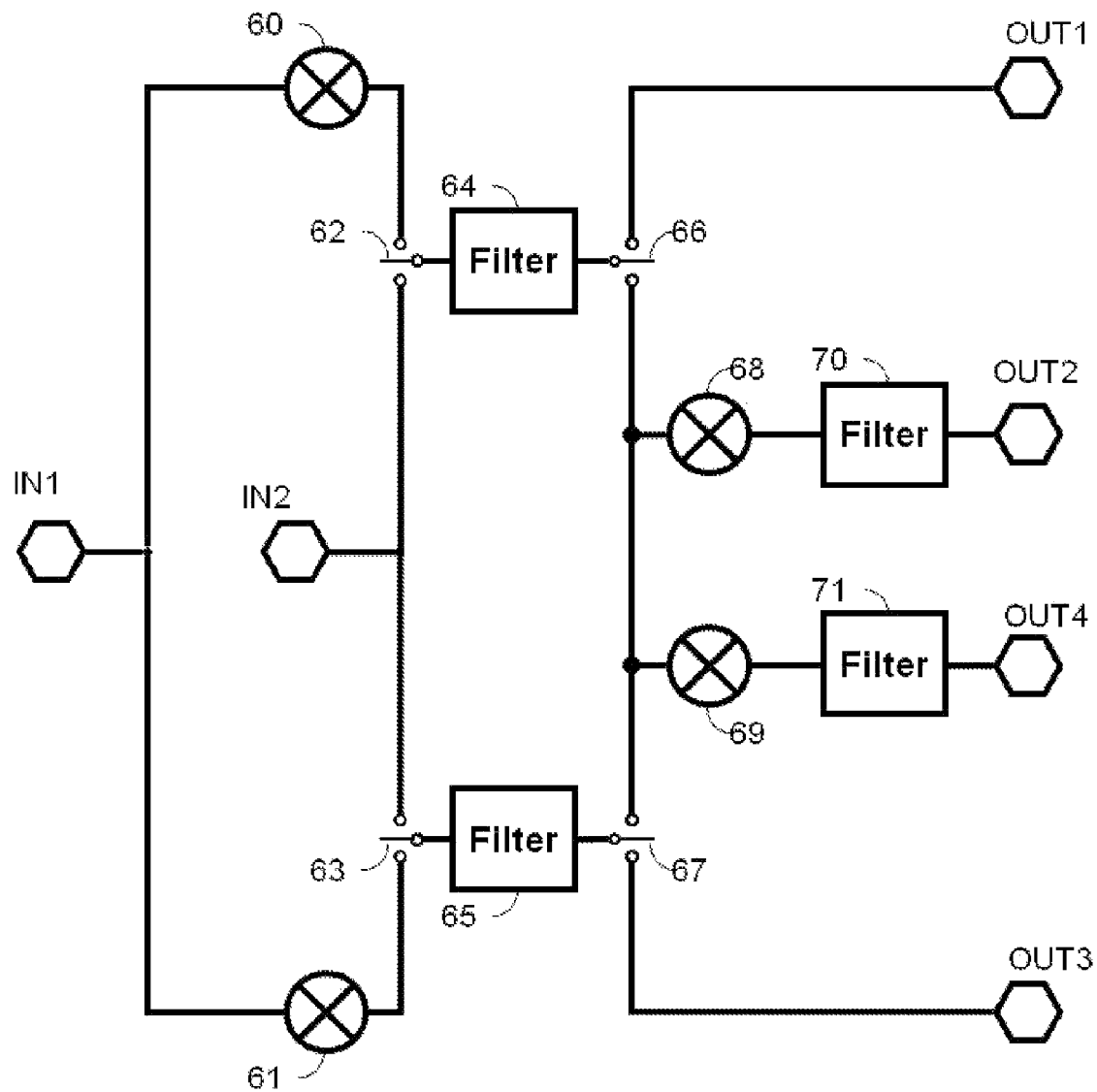
FIG. 7 is a circuit diagram showing a configuration of a receiver circuit according to exemplary embodiment 3 of the present invention.

The receiver circuit may further include a third filter (70 of FIG. 7) that removes a third frequency band of a signal output from the third mixer (68 of FIG. 7) and a fourth filter (71 of FIG. 7) that removes a fourth frequency band of a signal output from the fourth mixer (69 of FIG. 7).

The receiver circuit may further include a first switch (80 of FIG. 8) that enables the second signal to be entered to the third and fourth mixers. The third and fourth mixers may perform frequency conversion on one out of the second signal, the signal output from the third selector and the signal output from the fourth selector.

Figure 9:
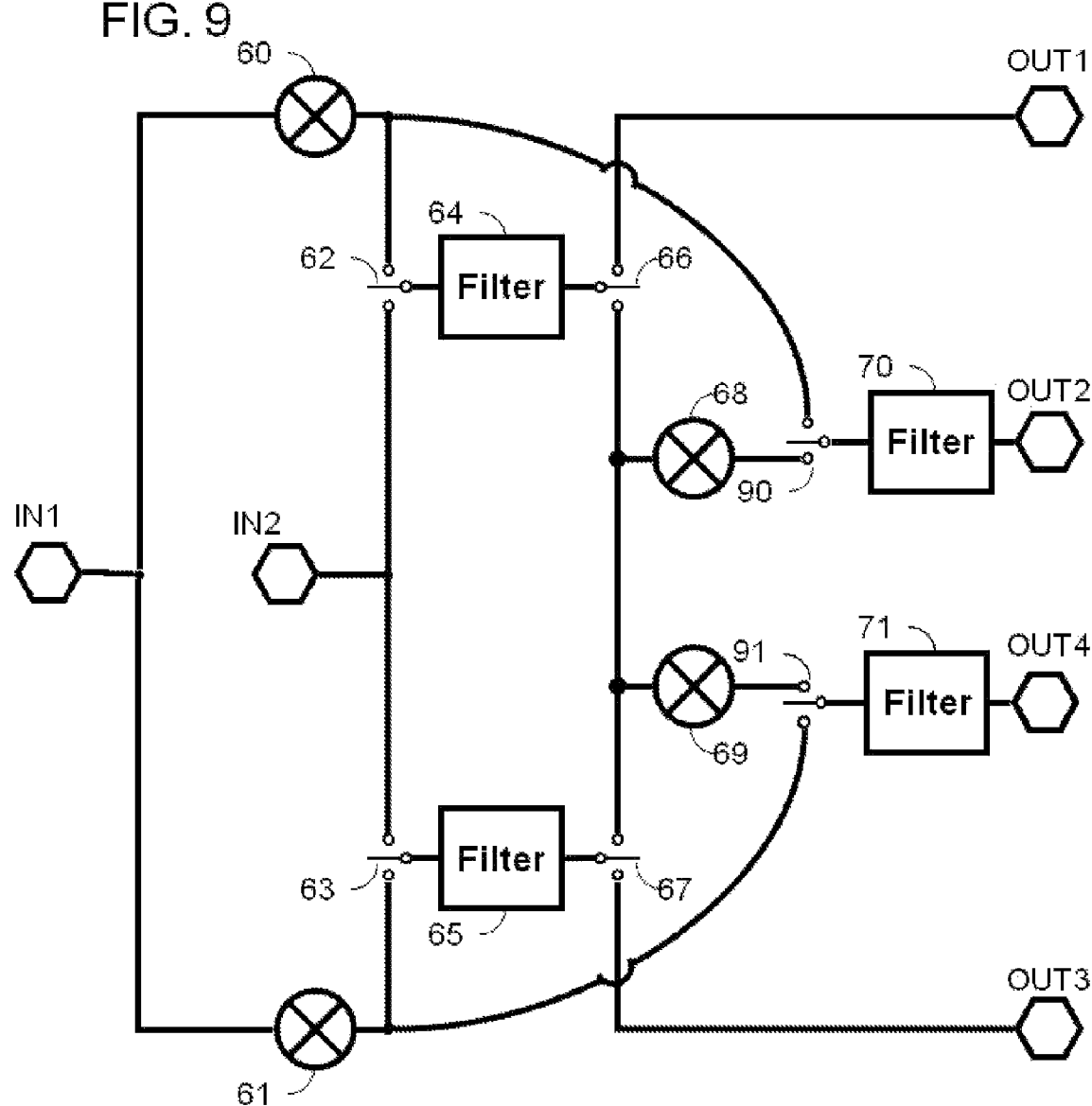
FIG. 9 is a circuit diagram showing a configuration of a receiver circuit according to exemplary embodiment 5 of the present invention.

The receiver circuit may also include a fifth selector (90 of FIG. 9) that enables one out of the signal output from the first mixer (60 of FIG. 9) and the signal output from the third mixer (68 of FIG. 9) to be entered to the third filter (70 of FIG. 9). The receiver circuit may further include a sixth selector (91 of FIG. 9) that enables one out of the signal output from the second mixer (61 of FIG. 9) and the signal output from the fourth mixer (69 of FIG. 9) to be entered to the fourth filter (71 of FIG. 9).

In the receiver circuit, a second selector (63*a* of FIG. 10) selects one out of the frequency-converted second component of the first signal, the second signal and the signal output from the first filter.

In the above receiver circuit, the channel selective filter of the first receiver system and the RF filter of the second receiver system may be combined together to suppress the chip area from increasing. In addition, the receiver may be of such a system that frequency conversion is performed a plurality of times depending on the wireless standards concerned, whereby it is possible to lower the local oscillator frequency to suppress power consumption of e.g., the driving circuit.

Certain preferred exemplary embodiments of the present invention will now be detailed with reference to the drawings. In the total of figures, referred to in the following, the same symbols are used to depict the same component elements and the corresponding explanation is sometimes dispensed with.

Exemplary Embodiment 1

FIG. 1 shows a configuration of a receiver circuit as exemplary embodiment 1 of the present invention. The receiver circuit of the subject exemplary embodiment includes a mixer 10 that performs frequency conversion on a first signal IN1 of a first frequency, entered from outside, and that outputs the resulting signal. The receiver circuit also includes a selector 11 that selects the signal output from the mixer 10 or a second signal IN2 of a second frequency entered from outside, and a filter 12 that removes a pre-set frequency band of the signal selected by the selector 11. The receiver circuit further includes a selector 13 and a mixer 14. The selector 13 selects between outputting the signal, freed of the frequency band, to outside as OUT1 and outputting the signal to the mixer 14. The mixer performs frequency conversion on the output signal from the selector 13 to output the resulting signal as a signal OUT2. It should be noticed that the mixer 10, selector 11, selector 13 and the mixer 14 are equivalent to a first mixer, a first selector, a second selector and a second mixer, respectively.

The operation of the receiver circuit of the subject exemplary embodiment will now be explained with the use of concrete numerical values.

Initially, a case of receiving a radio signal having a signal bandwidth not less than 100 MHz, such as UWB, as the first signal IN1, will be explained. The signal bandwidth of UWB is 528 MHz. It is assumed that the receiver system is a direct conversion system of directly converting the frequency of the RF signal into a baseband signal, and that the passband width of the filter 12 is one-half of the signal bandwidth, i.e. 264 MHz. The selector 11 is set to select the signal output from the mixer 10, the selector 13 is set to select outputting the signal as OUT1 to outside. The input UWB signal IN1 has its frequency converted by the mixer 10 and is entered to the filter 12 via the selector 11. The filter 12 operates as a channel selective filter to suppress an interfering wave from a neighbored channel. The filter 12 outputs just the desired channel signal via the selector 13 to outside as signal OUT1.

Next, a case of receiving, as the second signal IN2, a radio signal with the signal bandwidth not higher than 100 MHz, such as terrestrial digital television broadcast, is considered. Here, a case in which the radio signal has the carrier frequency of 230 MHz and a passband width of 8 MHz is taken as an instance. As in the case of UWB, the receiver system is a direct conversion system and a passband width of the filter 12 is the same as above, viz., 264 MHz. The selector 11 is set to select the second signal IN2, the selector 13 is set to select outputting to the mixer 14. The input signal of the terrestrial digital television broadcast is entered via the selector 11 to the filter 12. The filter 12 operates as an RF filter that selects just the signal of a pre-set carrier frequency, and outputs the desired signal via the selector 13 to the mixer 14. In the present instance of numerical figures, the filter 12 has a broad bandwidth in comparison with the carrier frequency. However, an offset of this order of magnitude is not problematical because it is unnecessary for the RF filter to suppress even an interfering signal of a frequency proximate to the carrier frequency. In a subsequent stage to the filter 12, the desired signal has its frequency converted by the mixer 14 so as to be then output as signal OUT2 to outside.

In the above example operation, the filter 12 plays both the role of a channel selective filter for the UWB receiver and the role of an RF filter for the receiver of the terrestrial digital television broadcast. It is thus possible to combine two filters, needed so far, into a single filter. Viz., the chip area may be reduced to advantage in comparison with the conventional system.

Moreover, the receiver circuit of the subject exemplary embodiment may be configured to deal not only with the direct conversion system but also with the dual conversion system in which frequency conversion is carried out twice. The operation of the dual conversion system will now be explained as a case of receiving a wireless LAN signal of the carrier frequency of 4980 MHz and a signal bandwidth of 20 MHz is taken as the first signal IN1 as an instance. For the operation of the dual conversion system, the selector 11 is set to select a signal from the mixer 10, while the selector 13 is set to select outputting to the mixer 14. The input wireless LAN signal is entered as the first signal IN1 to the mixer 10 for frequency conversion to an intermediate frequency band and then entered to the filter 12 via the selector 11. In more specific terms, the RF signal of 4980 MHz is mixed in the mixer 10 with a local oscillator signal of 4716 (=4980−264) MHz to output a signal of the intermediate frequency of 264 MHz. In the next following filter 12, interfering signals other than the signal in the intermediate frequency band is suppressed. It should be noticed that an interfering signal at 5244 (=4980+264) MHz, representing an image frequency with respect to the desired signal of 4980 MHz, is already sufficiently suppressed by an outside filter, so that there is no problem of cross-talk. An output signal of the filter 12 is delivered via the selector 13 to the mixer 14, where the signal has its frequency converted from the intermediate frequency into the baseband so as to be then output as signal OUT2 to outside.

In the dual conversion system, described above, the frequency of the local oscillator signal used in the mixer 10 may be suppressed to a value lower than in the direct conversion system, so that it is possible to suppress power consumption of a driving circuit operating at the local oscillator frequency of the mixer 10. On the other hand, the local oscillator frequency used in the mixer 14 is equal to the intermediate frequency and is sufficiently lower than the carrier frequency. Hence, the power consumption of a driving circuit operating in the mixer 14 at the local oscillator frequency may be discounted. Thus, if the dual conversion system is used, it is possible to advantage to suppress power consumption of the receiver in its entirely in comparison with the case of using the direct conversion system.

It is possible with the receiver circuit of the subject exemplary embodiment to perform just the removal of an interfering wave, providing that a digital circuit is to take charge of the frequency conversion. Such operation will now be described by taking, as an instance, a case in which a signal of terrestrial digital audio broadcast with the carrier frequency of 90 MHz and with the signal bandwidth of 430 kHz is received as the second signal IN2. In the present instance, the bandwidth of the filter 12 is preferably set to 90 MHz. However, a broader bandwidth may not be of a problem depending on the sampling frequency or the dynamic range of subsequent stage circuits. At this time, the selector 11 may be set to select the second signal IN2, while the selector 13 may be set to select transmitting to outside as signal OUT1. The input signal of the terrestrial digital audio broadcast is entered as the second signal IN2 via the selector 11 to the filter 12, which filter 12 suppresses wasteful interfering signals. An output signal of the filter 12 is delivered via selector 13 to outside as signal OUT1. The radio signal in the 90 MHz band is then converted outside from the analog signal into the digital signal which is then subject to sundry data processing operations inclusive of demodulation.

In the above described system, the filter 12 operates as an anti-aliasing filter that eliminates the interfering signal of a frequency not less than the Nyquist band for the analog-to-digital converter of the subsequent stage. Also, the processing of frequency conversion, removal of the interfering signal and amplitude adjustment are performed in its entirety by digital signal processing, whereby processing higher in accuracy may be achieved than in case of analog processing. In addition, if processing can be updated by software, the contents of the signal processing can be flexibly modified. Viz., in the present system, it is possible to cope flexibly with a plurality of wireless standards handling lower radio frequencies.

It is not strictly necessary that the numerical values for the carrier frequency, signal bandwidth, filter passband widths or the intermediate frequency are set to the above specified values.

Preferably, the filter 12 is a variable bandwidth filter in which the bandwidth is variable depending on whether the input signal from the selector 11 is the first signal IN1 or the second signal 12. Moreover, the filter 12 may be a variable characteristic filter that may have its characteristic varied to a low-pass, a bandpass, a high-pass or a band elimination characteristic depending on the wireless standards at hand or the communication environment.

The foregoing description has been directed to example operations for the direct conversion and dual conversion. However, this is only by way of illustration and is not intended to be limited to the foregoing description. These example operations may also be adapted to cases of other receiver systems, for example, a low intermediate frequency system which uses a local oscillator frequency different only slightly from the carrier frequency.

It is also preferred that, for the operation of the dual conversion system, the intermediate frequency is selected so that the ratio of the local oscillator frequency in the mixer 10 and that in the mixer 14 will be a whole number. By so doing, the local oscillator frequencies of the mixers 10, 14 may be generated with much ease based on a whole number based frequency division of a single local oscillator frequency.

In particular, the ratio of the local oscillator frequency of the mixer 10 and that of the mixer 14 is 1 to a power of 2 and, more preferably, to 1:2 or 1:4. In such case, a simple divide-by-2 frequency divider may be used, thus appreciably simplifying the circuit configuration.

Figure 2:
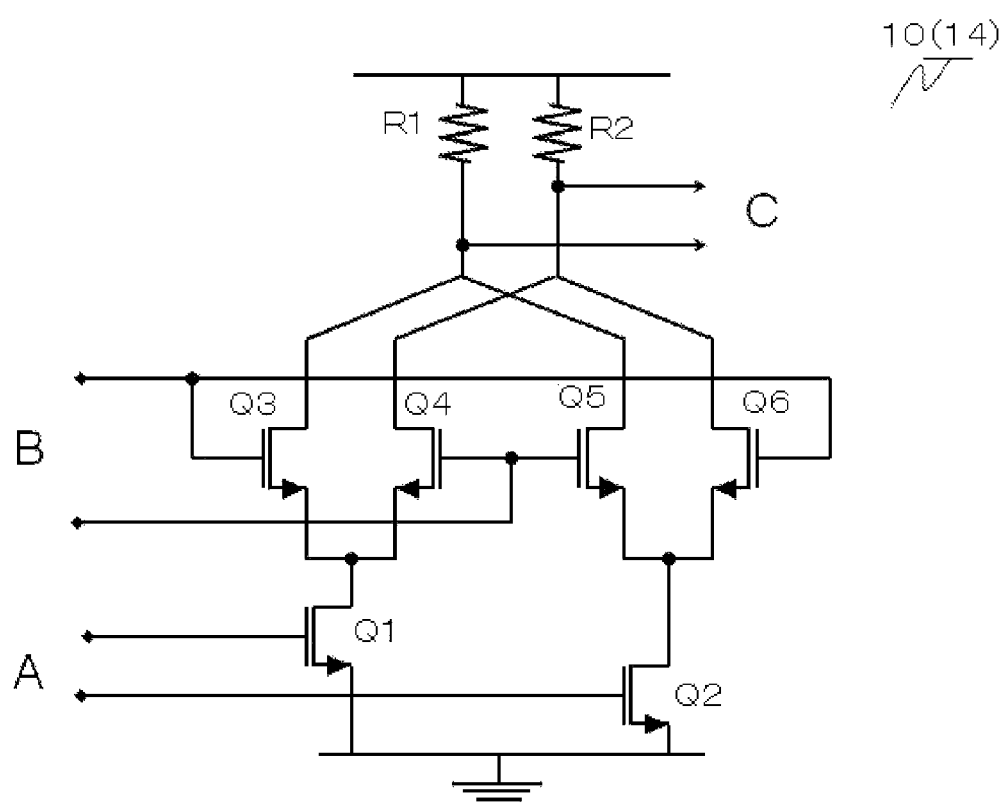
FIG. 2 is a circuit diagram showing an example of a mixer according to the exemplary embodiment 1.

The mixers 10, 14 will now be explained. A concrete example circuit for the mixer 10 (or 14) in the subject exemplary embodiment is shown in FIG. 2, in which the mixer 10 (14) has NMOS transistors Q1 to Q6 and resistors R1, R2. The NMOS transistors Q3, Q4 have their sources connected common and connected to the drain of the NMOS transistor Q, while having their gates connected to ports B and having their drains connected via the resistors R1, R2, respectively, to a power supply. The NMOS transistors thus form a differential pair. The NMOS transistors Q5, Q6 have their sources connected common and connected to the drain of the NMOS transistor Q2, while having their gates connected to the ports B in antiphase and having their drains connected via the resistors R1, R2, respectively, to the power supply. The NMOS transistors thus form another differential pair. The drains of the NMOS transistors Q3, Q5 are connected common to one of ports C, while the drains of the NMOS transistors Q4, Q6 are connected common to the other of the ports C. The NMOS transistors Q, Q2 have their sources grounded, while having their gates connected to ports A.

The mixer 10 (14) of the above configuration, termed a Gilbert cell mixer, mixes differential signals at the ports A and B to output the mixed signals as differential signals to the ports C, and is used in general in an RF circuit. The received RF signal and the local oscillator signal are entered as respective differential signals to the ports A, B, and a baseband signal is output at the ports C as differential signals.

Figure 3:
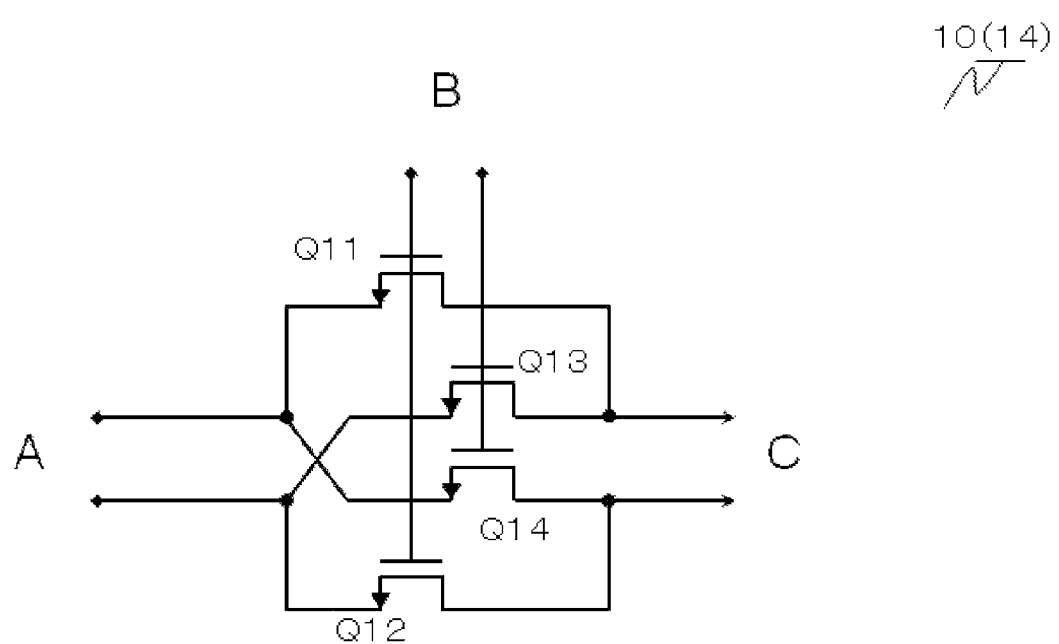
FIG. 3 is a circuit diagram showing another example of a mixer according to the exemplary embodiment 1.

Another example circuit of the mixers 10, 14 is shown in FIG. 3, in which the mixer 10 (14) includes NMOS transistors Q11 to Q14. The NMOS transistor Q11 has its source connected to one of ports A, while having its gate connected to one of ports B and having its drain connected to one of ports C. The NMOS transistor Q12 has its source connected to the other of the ports A, while having its gate connected to one of the ports B and having its drain connected to the other of the ports C. The NMOS transistor Q13 has its source connected to the other of the ports A, while having its gate connected to the other of the ports B and having its drain connected to one of the ports C. The NMOS transistor Q14 has its source connected to one of the ports A, while having its gate connected to the other of the ports B and having its drain connected to the other of the ports C.

The mixer 10 (14) of the above configuration is a passive mixer that mixes the differential signals at the ports A (C) and B to output a signal at the ports C (A) as differential signals. Though not having a gain, the mixer is high in linearity to advantage. Note that the input signals as well as the output signals at the ports A, B, C are similar to those of FIG. 2.

Figure 4:
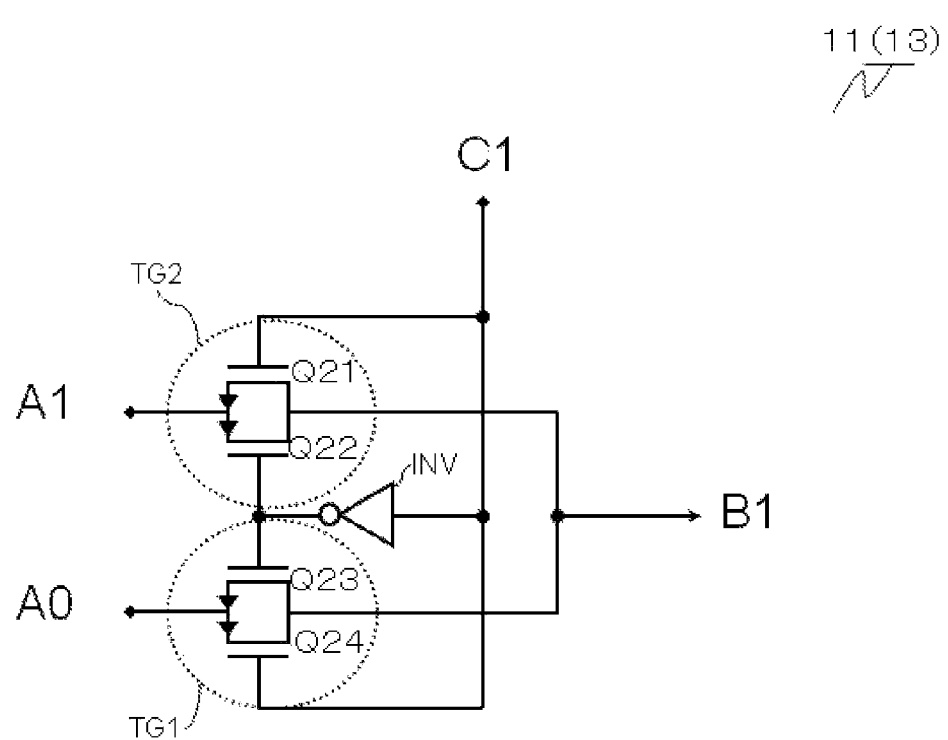
FIG. 4 is a circuit diagram showing an example of a selector according to the exemplary embodiment 1.

The selector 11, 13 will now be explained. A concrete example circuit of the selector 11 and 13 is shown in FIG. 4. In this figure, the selector 11 (13) is made up by an inverter element (inverter) INV and two transfer gates TG1, TG2 each formed by an NMOS transistor and a PMOS transistor. There is shown only one of two transfer gate pairs for one of the differential signals. The other transfer gate pair may be of a comparable configuration.

The transfer gate TG2 includes an NMOS transistor Q21 and a PMOS transistor Q22 whose drains are connected common and whose sources are also connected common. The NMOS transistor Q21 and the PMOS transistor Q22 have their sources connected to a port A1, while having their drains connected to a port B1. The transfer gate TG1 includes an NMOS transistor Q23 and a PMOS transistor Q24 whose drains are connected common and whose sources are also connected common. The NMOS transistor Q23 and the PMOS transistor Q24 have their sources connected to a port A0, while having their drains connected to the port B1. The NMOS transistor Q21 and the PMOS transistor Q24 have their gates connected to a port C1, while the PMOS transistor Q22 and the NMOS transistor Q23 have their gates connected to an output of the inverter element INV that inverts the logical value appearing at the port C1.

In the above configuration of the selector 11 (13), when the voltage at port C1 is Low, the transfer gate TG1 is rendered electrically conductive, while the transfer gate TG2 is open, thus setting a short-circuited state between the ports A0 and B1. On the other hand, when the voltage at port C1 is High, the transfer gate TG1 is open, while the transfer gate TG2 is rendered electrically conductive, thus setting a short-circuited state between the ports A1 and B1.

The above selector 11 (13) is provided for each of the differential signals. Note that, if the selector 11 (13) is to operate so as not to select any of the ports A0, A1, a logic circuit, not shown, configured to exercise control to cause the transfer gates TG1, TG2 to be opened at the same time, is added. Three or more sets of transfer gates may also be arranged side-by-side and controlled by respective separate signals, whereby a selector may be constructed that selects one out of three or more routes.

Figure 5:
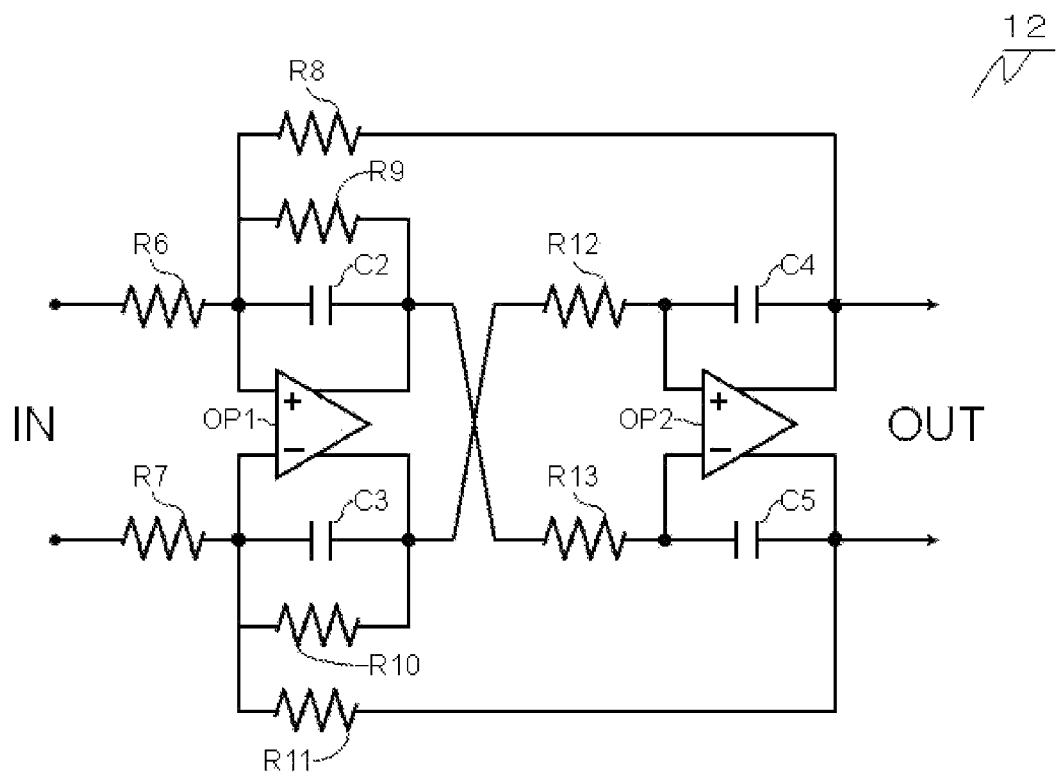
FIG. 5 is a circuit diagram showing an example of a filter according to the exemplary embodiment 1.

The filter 12 will now be explained. FIG. 5 shows a concrete example circuit of the filter 12. The filter 12 is an active filter made up by operational amplifiers OP1, OP2, capacitance elements C2 to C5 and resistor elements R6 to R13.

In the operational amplifier OP1, the capacitance element C2 and the resistor element R9 are connected in parallel between the non-inverting output end and the non-inverting input end of the operational amplifier. The capacitance element C3 and the resistor element R10 are connected in parallel between the inverting output end and the inverting input end of the operational amplifier. The non-inverting input end of the operational amplifier is connected via resistor element R6 to one end of an input port In, while the inverting input end is connected via resistor element R7 to the other end of the input port IN. In the operational amplifier OP2, the capacitance element C4 is connected between the non-inverting output end and the non-inverting input end of the operational amplifier, the capacitance element C5 is connected between the inverting output end and the inverting input end. The non-inverting input end of the operational amplifier OP2 is connected via the resistor element R12 to the inverting output end of the operational amplifier OP1. The inverting input end of the operational amplifier OP2 is connected via the resistor element R13 to the non-inverting output end of the operational amplifier OP1. The non-inverting output end of operational amplifier OP2 is connected via the resistor element R8 to the non-inverting input end of the operational amplifier OP1. The inverting output end of operational amplifier OP2 is connected via the resistor element R11 to the inverting input end of the operational amplifier OP1. The non-inverting output end and the inverting output end are connected respectively to the one end and the other end of an output port OUT.

The above filter 12 is a second order low pass filter that may transmit a low range frequency of the differential signals at the input port IN and that outputs the differential signals at the output port OUT. The passband width of the filter may be changed by controlling the capacitance value or the resistance value. A Gm-C filter that uses a voltage-to-current converter and a capacitance or an LC filter that uses an inductor and a capacitance element may also be used. These filters may have their passbands changed by controlling the values of respective elements such as a voltage-to-current conversion gain, an inductance value or a capacitance value.

Exemplary Embodiment 2

Figure 6:
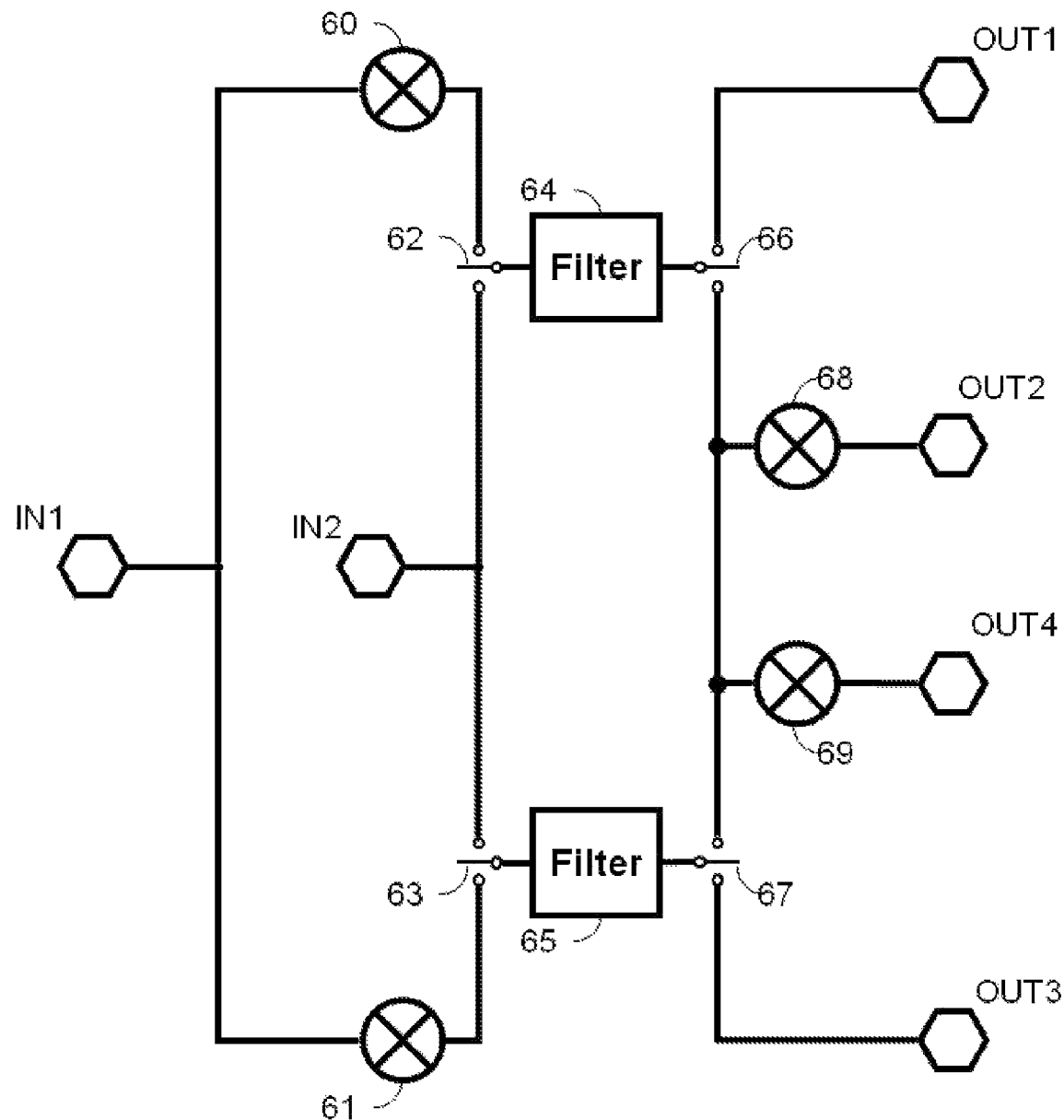
FIG. 6 is a circuit diagram showing a configuration of a receiver circuit according to exemplary embodiment 2 of the present invention.

FIG. 6 shows a configuration of a receiver circuit according to an exemplary embodiment 2 of the present invention. The receiver circuit of the subject exemplary embodiment includes a mixer 60 that performs frequency conversion on a first component of a first signal IN1 of a first frequency delivered from outside to output the frequency converted first component. The receiver circuit also includes a mixer 61 that performs frequency conversion on a second component of the first signal to output the frequency converted second component. The receiver circuit also includes a selector 62 that selects one out of the first component of the first signal IN1 following the frequency conversion and a second signal IN2 of a second frequency as delivered from outside. The receiver circuit also includes a selector 63 that selects one out of the frequency converted first component of the first signal and the second signal. The receiver circuit also includes a filter 64 that removes a first frequency band of the signal selected by the selector 62 and a filter 65 that removes a second frequency band of the signal selected by the selector 63. The receiver circuit also includes a selector 66 that selects between outputting the signal freed of the first frequency band to outside as signal OUT1 and outputting it to a subsequent stage circuit. The receiver circuit also includes a selector 67 that selects between outputting the signal freed of the second frequency band to outside as signal OUT3 and outputting it to a subsequent stage circuit. The receiver circuit further includes mixers 68, 69, as subsequent stage circuits, which circuits output signals delivered from the selectors 66, 67 following the frequency conversion. The mixers 68, 69 respectively output signals OUT2, OUT4 to outside.

The mixers 60, 61, 68, 69 are respectively equivalent to first, second, third and fourth mixers, the selectors 62, 63, 66, 67 are respectively equivalent to first, second, third and fourth selectors. The filters 64, 65 are respectively equivalent to first and second filters. The stopbands of the filters 64, 65 are respectively equivalent to first and second frequency bands.

In the mixers 60, 61 of the receiver circuit of the subject exemplary embodiment, frequency conversion and quadrature demodulation are performed at the same time with the use of respective local oscillator signals having the same frequency and a phase offset of 90° from each other. An I-phase (in-phase) component and a Q-phase (quadrature phase) component of the baseband signal may thus be obtained, in which the I-phase component is the first component and the Q-phase is the second component. In similar manner, frequency conversion and quadrature demodulation are performed at the same time in the mixers 68, 69, whereby the I-phase and the Q-phase of the baseband signal may be respectively obtained as signals OUT2, OUT4.

If the second signal IN2 is received, both the filters 64 and 65 may be used as parallel circuits, or just one of them may be used. Specifically, when both the selectors 62, 63 select the second signal IN2 and both the selectors 66, 67 select outputting to the mixers 68, 69, the filters 64, 65 are arrayed in parallel. In this case, the noise is lower than in case just one of the filters is used. If, in this state, the selectors 63, 67 are opened, just the filter 64 is in use to block the circuit of the filter 65. Viz., power consumption may be suppressed to lower values than in the case of using both filters.

In case of receiving the first signal IN1 by the dual conversion system, the mixers 60, 61 may perform frequency conversion into the intermediate frequency without performing quadrature demodulation. In this case, the mixers 68, 69 may perform frequency conversion from the intermediate frequency into the baseband simultaneously with quadrature demodulation. At this time, the selectors 62, 63 are set respectively to select outputs from the mixers 60, 61, while the selectors 66, 67 are set respectively to select outputting to the mixers 68, 69. On the other hand, the mixers 60, 61 use common local oscillator signals, while the mixers 68, 69 use local oscillator signals phase-offset by 90° from each other. By so doing, as the outputs of the mixers 68, 69, the I-phase baseband signal and the Q-phase baseband signal may be respectively obtained as OUT2, OUT4.

Preferably, the filters 64, 65 are variable bandwidth filters with bandwidths variable depending on whether the input signal is the first signal IN1 or the second signal IN2. They may also be variable characteristic filters that may have their characteristic varied to a low-pass, bandpass, a high-pass or a band elimination characteristic depending on the wireless standards at hand or the communication environment.

The above description has been made of example operations of the direct conversion system and the dual conversion system. However, this is only by way of illustration and is not intended to limit the present invention. These example operations may also be adapted to cases of other receiver systems including a low intermediate frequency system that uses a local oscillator frequency just slightly different from the carrier frequency.

It should be noted that intermediate frequency selection is preferably made so that the ratio of the local oscillator frequency in the mixers 60, 61 and that in the mixers 68, 69 at the time of the operation of the dual conversion system will be a whole number. In this case, the local oscillator signals in the mixers 60, 61 and 68, 69 may be generated with much ease by performing frequency division by whole number based on a single local oscillator signal. Moreover, the ratio of the local oscillator frequency in the mixers 60, 61 and the local oscillator frequency in the mixers 68, 69 is preferably a 1 to a power of 2, in particular 1:2 or 1:4. By so doing, a simple divide-by-2 frequency divider may be used, thus appreciably simplifying the circuit configuration.

Exemplary Embodiment 3

FIG. 7 shows a configuration of a receiver circuit as an exemplary embodiment 3 of the present invention. The receiver circuit of the subject exemplary embodiment differs from the receiver circuit of the exemplary embodiment 2 in that filters 70, 71 are added on the subsequent stage side to the mixers 68, 69. The filters 70, 71 are respectively equivalent to third and fourth filters and the stopbands of the filters 70, 71 are respectively equivalent to third and fourth frequency bands. When the receiver circuit of the subject exemplary embodiment is receiving the first signal IN1, the filters 64, 65 perform channel selection. When the receiver circuit of the subject exemplary embodiment is receiving the second signal IN2, the filters 64, 65 perform removal of the interfering wave and the filters 70, 71 perform channel selection. In similar manner, in the dual conversion system, the filters 70, 71 are able to perform channel selection.

In the case of the receiver system of the low intermediate frequency system in which the mixers 68, 69 perform frequency conversion not into the baseband but into a low intermediate frequency, the filters 70, 71 may be a complex bandpass filter capable of suppressing an image signal.

Exemplary Embodiment 4

Figure 8:
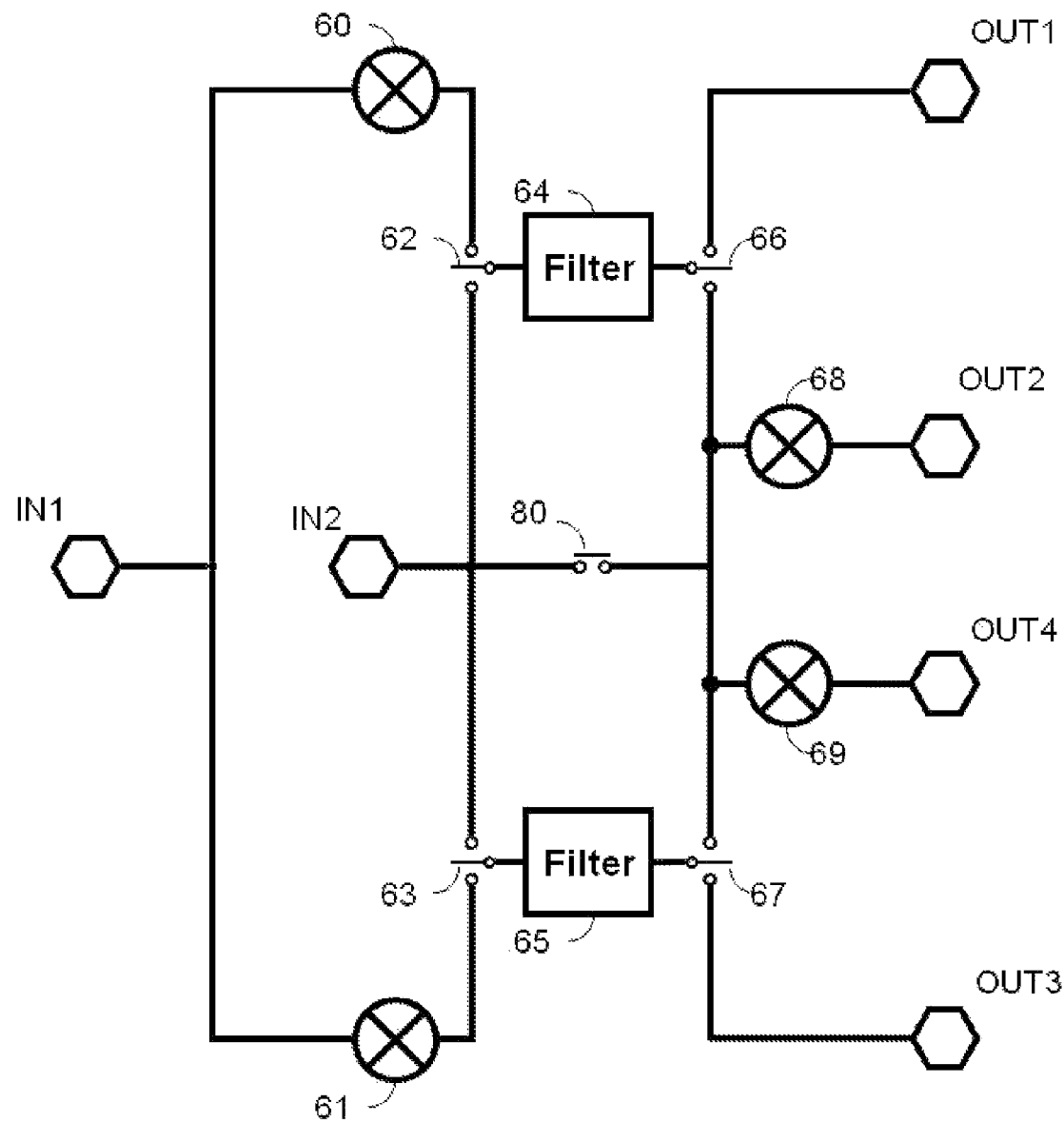
FIG. 8 is a circuit diagram showing a configuration of a receiver circuit according to exemplary embodiment 4 of the present invention.

FIG. 8 shows a configuration of a receiver circuit as an exemplary embodiment 4 of the present invention. The receiver circuit of the subject exemplary embodiment differs from the receiver circuit of the exemplary embodiment 2 in that a switch 80 is added on a signal path on which the second signal IN2 is delivered to the mixers 68, 69. It should be noticed that the switch 80 is equivalent to a first switch. It should also be noticed that the mixer 68 performs frequency conversion on a signal selected by the selector 66 or the second signal IN2 delivered via the switch 80, and that the mixer 69 performs frequency conversion on a signal selected by the selector 67 or on the second signal IN2 entered via the switch 80.

The receiver circuit of the subject exemplary embodiment is able to receive the first signal IN1 and the second signal IN2 at the same time. Viz., the selectors 62, 63 are respectively set to select signals of the mixers 60, 61, while the selectors 66, 67 select outputting to outside and the switch 80 is rendered electrically conductive. At this time, the I-component of the first signal IN1 is delivered as signal OUT1 to outside via the mixer 60, selector 62, filter 64 and the selector 66, while the Q-component of the first signal IN1 is delivered as signal OUT3 to outside via the mixer 61, selector 63, filter 65 and the selector 67. On the other hand, the I-component of the second signal IN2 is delivered as signal OUT2 to outside via the switch 80 and mixer 68, while the Q-component of the second signal IN2 is delivered as signal OUT4 to outside via the switch 80 and the mixer 69. By the above operation, the I-phase and the Q-phase of the baseband signal may be obtained for each of the first and second signals IN1, IN2. Viz., signals may be received at the same time for a plurality of wireless standards, such as UWB and the terrestrial digital broadcast.

However, since there is no RF filter on the path for reception of the second signal IN2, limitations are imposed on the manner of selecting the carrier frequency or the local oscillator frequency of the mixers 68, 69 so that cross-talk in the circuitry subsequent to the mixers 68, 69 will not be of a problem. For example, it is necessary that an interfering signal located in the high harmonics of the carrier frequency is pre-removed by a band selective filter outside the chip.

It should be noticed that the operation in case the switch 80 is in the open state is similar to that of the exemplary embodiment 2.

Exemplary Embodiment 5

FIG. 9 shows a configuration of a receiver circuit as an exemplary embodiment 5 of the present invention. The receiver circuit of the subject exemplary embodiment differs from the receiver circuit of the exemplary embodiment 3 in that the subject exemplary embodiment includes selectors 90, 91. The selector 90 selects an output of the mixer 60 or an output of the mixer 68 to deliver the so selected output, while the selector 91 selects an output of the mixer 61 or an output of the mixer 69 to deliver the so selected output. The selectors 90, 91 are respectively equivalent to fifth and sixth selectors.

The operation of the receiver circuit will now be explained in the following. The selectors 62, 63 select the second signal IN2 or are opened for any routes. The selectors 90, 91 are set respectively to select outputs of the mixers 60, 61. In this case, the first signal IN1 has its frequency converted by the mixers 60, 61 into a baseband signal, at the same time as the first signal is quadrature demodulated. The resulting signal is then respectively output via the selectors 90, 91 to the filters 70, 71 for channel selection and is delivered as OUT2, OUT4 to outside. The receiver circuit of the subject exemplary embodiment is effective in case the carrier frequency is high but the signal bandwidth is narrow, such that, by blocking the circuits of the filters 64, 65 or the mixers 68, 69, which are not in use, it is possible to suppress power consumption.

The operation in a state the selectors 90, 91 have respectively selected outputs of the mixers 68, 69 is similar to that in the exemplary embodiment 3.

Exemplary Embodiment 6

Figure 10:
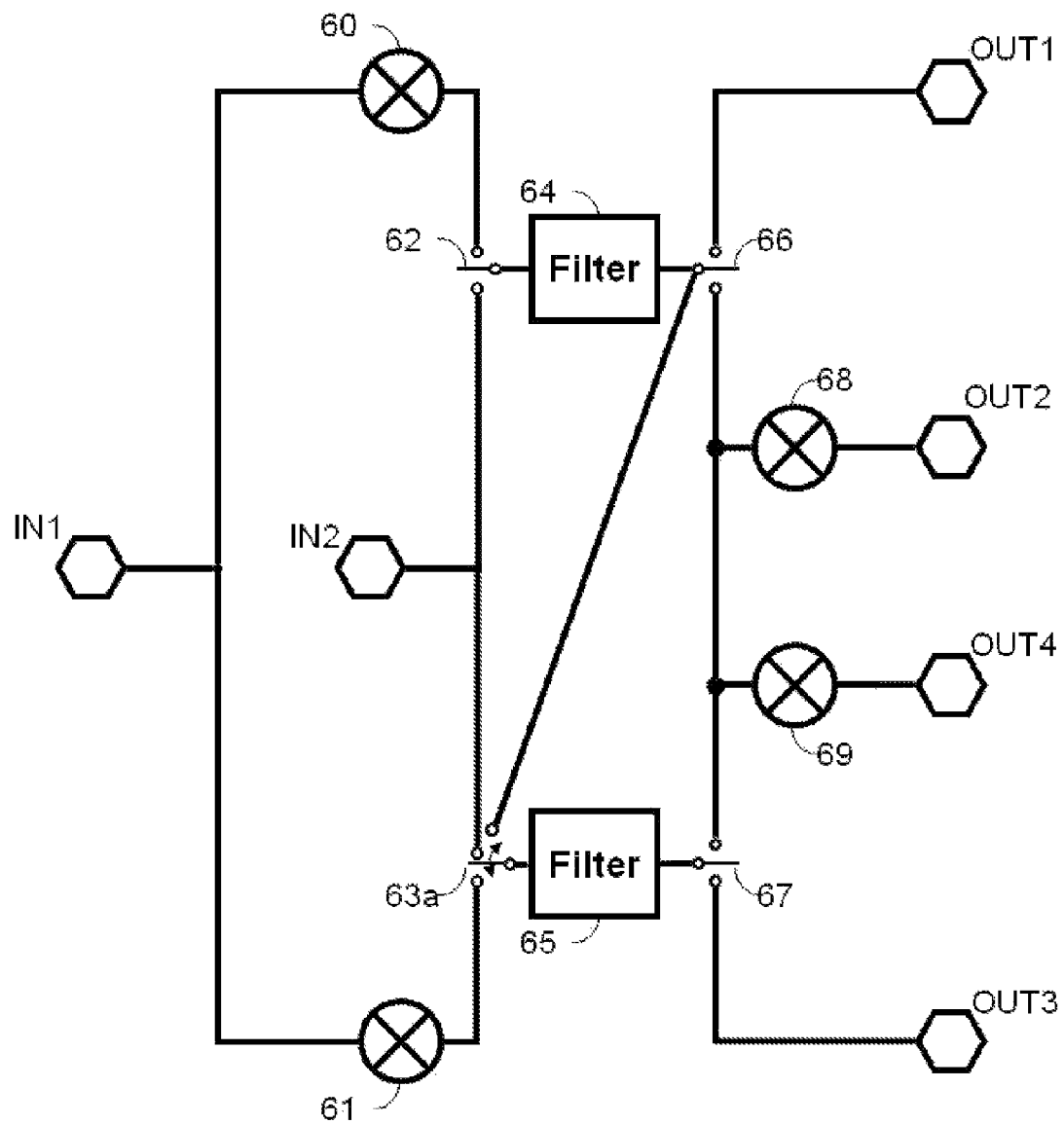
FIG. 10 is a circuit diagram showing a configuration of a receiver circuit according to exemplary embodiment 6 of the present invention.
Figure 11:
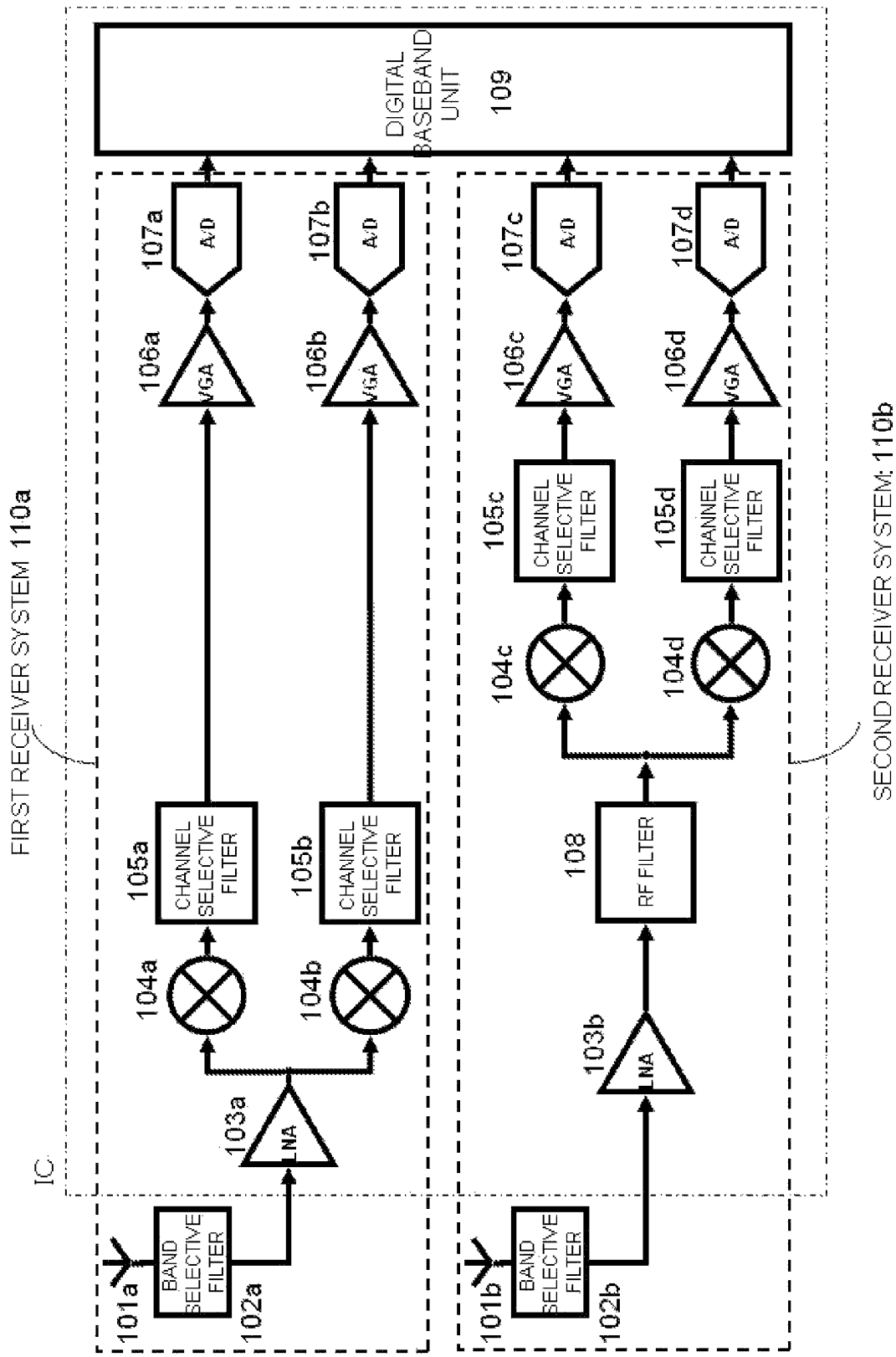
FIG. 11 is a block diagram showing a configuration of a conventional receiver designed to accommodate a plurality of wireless standards.

FIG. 10 shows a configuration of a receiver circuit as an exemplary embodiment 6 of the present invention. The receiver circuit of the subject exemplary embodiment differs from the exemplary embodiment 2 in that a selector 63a is used in place of the selector 63. The selector 63a selects one out of an output of the mixer 61, the second signal IN2 and an output of the filter 64 to output the so selected signal to the filter 65. The receiver circuit of the subject exemplary embodiment is set, in receiving the second signal IN2, so that the selector 62 selects the second signal IN2, the selector 66 is opened, the selector 63a connects to an output of the filter 64 and the selector 67 connects to the mixers 68, 69. Since the filters 64, 65 are connected in this manner in cascade, the number of orders of the filter is doubled to assure a more acute blocking characteristic. Viz., even under a condition in which a stronger interfering signal persists, the interfering signal may be sufficiently suppressed to enable just the desired signal to be received.

If the selector 62 selects an output of the mixer 60, the selector 66 is opened and the selector 63a is connected to the output of the filter 64, it is possible to receive the first signal IN1 as well. However, since quadrature demodulation cannot be performed in the mixers 60, 61, the selector 67 selects outputting to the mixers 68, 69 so that these mixers 68, 69 will perform the quadrature demodulation by way of implementing the dual conversion system. Or, the selector 67 has to select outputting to outside in order to perform the quadrature demodulation outside.

It should be noted that the operation in case the selector 63a has selected the mixer 61 or the second signal IN2 is the same as that in the exemplary embodiment 2.

The disclosures of the aforementioned Patent and Non-Patent Literatures are incorporated herein by reference thereto. The particular exemplary embodiments or examples may be modified or adjusted within the scope of the entire disclosure of the present invention, inclusive of claims, based on the fundamental technical concept of the invention. In addition, variegated combinations or selections of the elements herein disclosed, inclusive of the elements of the claims, examples or drawings, may be made within the concept of the claims. Viz., the present invention may encompass various modifications or variations that may occur to one skilled in the art within the gamut of the entire disclosure of the present invention, inclusive of claims and the technical concept of the invention.

REFERENCE SIGNS LIST 10, 14, 60, 61, 68, 69 mixers
11, 13, 62, 63, 63a, 66, 67, 90, 91 selectors
12, 64, 65, 70, 71 filters
80 switch
C2~C5 capacitance elements
INV inverter
OP1, OP2 operational amplifiers
Q1~Q6, Q11~Q14, Q21, Q23 NMOS transistors
Q22, Q24 PMOS transistors
R1, R2, R6~R13 resistors
TG1, TG2 transfer gates

What is claimed is:
1. A receiver circuit, comprising:
a first mixer that performs frequency conversion on a first component of a first signal containing a first frequency, entered from outside, to output a resulting frequency-converted first component of the first signal;
a second mixer that performs frequency conversion on a second component of the first signal to output a resulting frequency-converted second component of the first signal;
a first selector that selects the frequency-converted first component of the first signal or a second signal containing a second frequency, entered from outside;
a second selector that selects the frequency converted second component of the first signal or the second signal;
a first filter that removes a first frequency band of the signal selected by the first selector;
a second filter that removes a second frequency band of the signal selected by the second selector;
a third selector that selects between outputting to outside and outputting to a subsequent side circuit(s) of the signal removed of the first frequency band;

a fourth selector that selects between outputting to outside and outputting to the subsequent side circuit(s) of the signal removed of the second frequency band; and third and fourth mixers that perform frequency conversion on the signal output from the third selector or the signal output from the fourth selector; the third and fourth mixers being the subsequent side circuits.

2. The receiver circuit according to claim 1, wherein, the first frequency band is determined depending on whether the signal selected by the first selector is the signal output from the first mixer or the second signal;

the second frequency band being determined depending on whether the signal selected by the second selector is the signal output from the second mixer or the second signal.

3. The receiver circuit according to claim 1, further comprising:

a third filter that removes a third frequency band of the signal output from the third mixer; and a fourth filter that removes a fourth frequency band of the signal output from the fourth mixer.

4. The receiver circuit according to claim 1, further comprising:

a first switch that enables the second signal to be entered to the third and fourth mixers;

the third and fourth mixers performing frequency conversion on one out of the second signal, the signal output from the third selector and the signal output from the fourth selector.

5. The receiver circuit according to claim 1, further comprising:

a fifth selector that enables one out of the signal output from the first mixer and the signal output from the third mixer to be entered to the third filter; and a sixth selector that enables one out of the signal output from the second mixer and the signal output from the fourth mixer to be entered to the fourth filter.

6. The receiver circuit according to claim 2, further comprising:

a third filter that removes a third frequency band of the signal output from the third mixer; and a fourth filter that removes a fourth frequency band of the signal output from the fourth mixer.

7. The receiver circuit according to claim 2, further comprising:

a first switch that enables the second signal to be entered to the third and fourth mixers;

the third and fourth mixers performing frequency conversion on one out of the second signal, the signal output from the third selector and the signal output from the fourth selector.

8. The receiver circuit according to claim 2, further comprising:

a fifth selector that enables one out of the signal output from the first mixer and the signal output from the third mixer to be entered to the third filter; and a sixth selector that enables one out of the signal output from the second mixer and the signal output from the fourth mixer to be entered to the fourth filter.

9. The receiver circuit according to claim 1, wherein, the second selector selects one out of the frequency-converted second component of the first signal, the second signal and the signal output from the first filter.

* * * * *